UNITED STATES PATENT OFFICE.

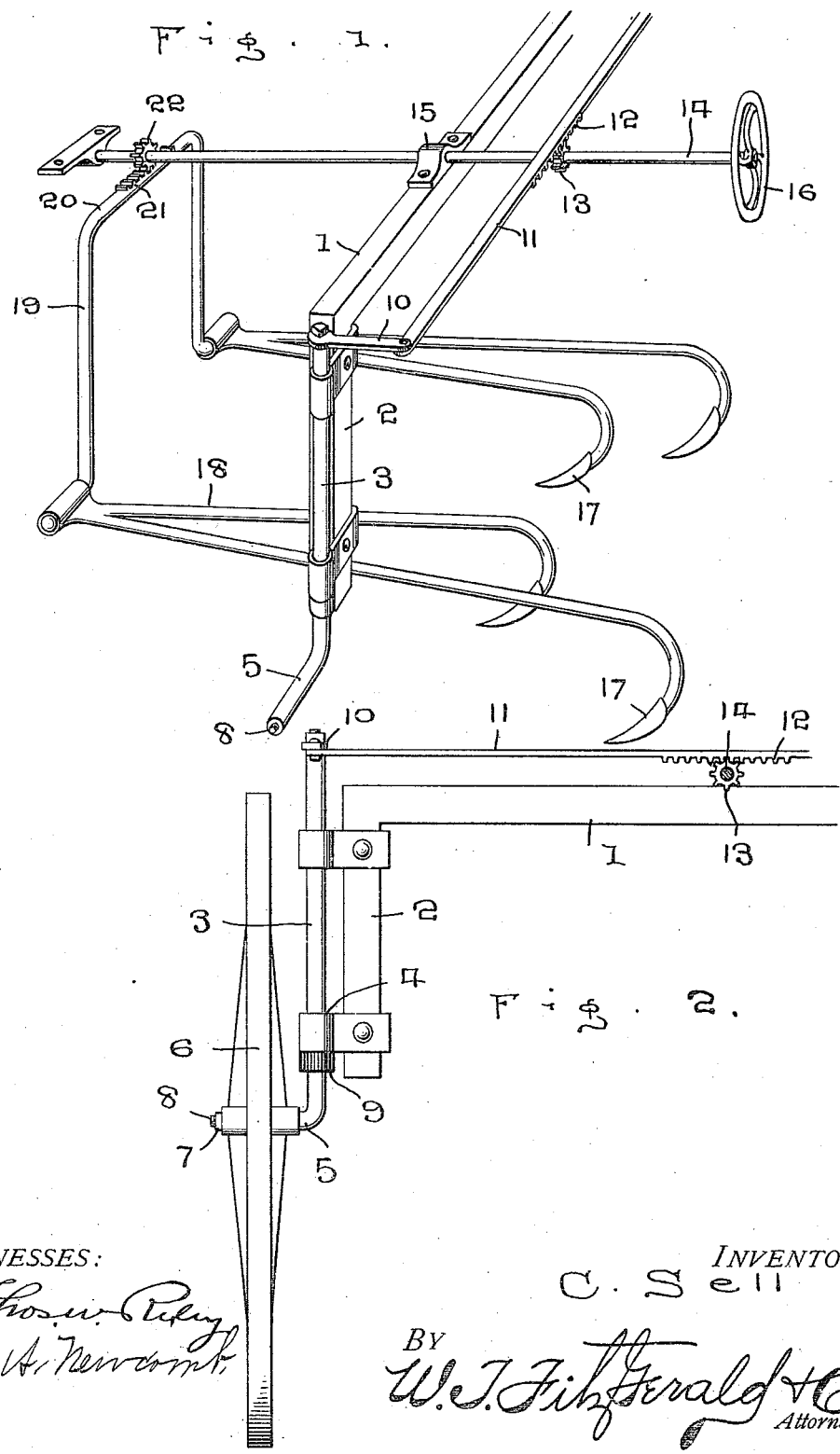

CONRAD SELL, OF ARCADIA, NEBRASKA.

CULTIVATOR ATTACHMENT.

957,579. Specification of Letters Patent. Patented May 10, 1910.

Application filed June 11, 1909. Serial No. 501,615.

*To all whom it may concern:*

Be it known that I, CONRAD SELL, a citizen of the United States, residing at Arcadia, in the county of Valley and State of Nebraska, have invented certain new and useful Improvements in Cultivator Attachments; and I do hereby declare the following to be a full, clear, and exact description of the invention, such as will enable others skilled in the art to which it appertains to make and use the same.

My invention relates to new and useful improvements in attachments for cultivators and my object is to provide means for guiding the cultivator frame independently of the draft animals and a further object is to provide means for simultaneously shifting the parts carrying the cultivator shovels and shanks to retain the same in proper relationship with the row.

Other objects and advantages will be hereinafter referred to and more particularly pointed out in the claims.

In the accompanying drawings forming part of this application, Figure 1 is a perspective view of a portion of the cultivator frame showing my improved attachments applied thereto, and, Fig. 2 is an elevation of a portion of the frame and operating parts.

Referring to the drawings in which similar reference numerals designate corresponding parts throughout the several views, 1 indicates the frame of a wheeled cultivator, to the depending portions 2 of which are secured standards 3, there being a standard at each edge of the frame, said standards being rotatably mounted in sockets 4 which are secured in any preferred manner to the depending portions 2. The lower ends of the standards 3 are extended at right angles to form spindles 5, upon which are to be mounted the usual or any preferred form of supporting wheels 6, said wheels being secured on the spindles in any preferred manner, as by means of nuts 7, which engage the threaded stems 8 at the outer or free ends of the spindles and in order to limit the vertical movement of the standards 3, said standards are provided with collars 9, which are adapted to engage the lower edge of the lowermost socket 4 and bear thereagainst, the object in rotatably mounting the standards 3 being to permit the wheels to be swung inwardly or outwardly to guide the frame 1 independently of the draft animals. To readily accomplish this result, the upper ends of the standards 3 are provided with levers 10, which are fixed to the standards in any suitable manner and are connected at their outer ends by means of a bar 11 and it will be readily seen that by moving said bar lengthwise, one of the wheels will be moved inwardly at its forward edge and the opposite wheel outwardly at its forward edge, thereby quickly shifting or moving the frame of the cultivator laterally as said cultivator is moved forwardly.

At the longitudinal center of the bar 11 and preferably on the under face thereof is provided a toothed rack 12, with which is adapted to coöperate a pinion 13 carried by a shaft 14, said shaft being mounted in suitable bearings 15 and it will be readily seen that by grasping the hand wheel 16 at the outer end of the shaft 14 and rotating the shaft 14, the bar 11 will be shifted longitudinally to properly position the wheels to guide the cultivator.

The cultivator shovels 17 are attached to the usual form of shanks 18, the forward ends of said shanks being in turn attached to the lower ends of the yoke 19, said yoke being movably attached to parts of the cultivator frame, whereby said yoke may be moved laterally to retain the shovels in alinement with the row of plants being cultivated and in order to simultaneously operate the yoke with the turning of the wheels, the horizontal portion 20 of the yoke 19 is provided with a toothed rack 21, which is adapted to coöperate with a pinion 22 on the shaft 14 and by placing the pinion above the horizontal portion 20, the yoke will be moved in opposition to the bar 11, that is to say, when the shaft 14 is turned to the left, the bar 11 will be moved longitudinally to the left, while the yoke 19 will be moved bodily to the right and by this double adjustment, it will be readily seen that the cultivator shovels may be readily kept in alinement with the row, even though the draft animals move out of direct alinement with the row.

In operation, supposing the draft animals move out of direct alinement with the row, or to the left thereof, whereby the shovels at the right side of the cultivator will be drawn into close proximity to the row, the shaft 14 is to be rotated to the left, which will result in turning the wheels to move the frame of the cultivator laterally or toward the right, while the yoke 19 will be simultaneously moved to the right, thereby maintaining the shovels in proper alinement with the row until such time as the draft animals can be brought into proper alinement with the row, when the shaft 14 is operated to bring the wheels to the proper course and move the yoke to the proper position on the cultivator frame.

It will be readily understood that this form of device can be very cheaply constructed and at the same time made strong and durable and by properly manipulating the shaft, the turning operation at the ends of the rows may be more readily accomplished.

What I claim is:

1. A cultivator attachment comprising a frame, a movable yoke, said yoke having a rack upon its upper surface, about centrally thereof, standards of right angled outline having their vertical portions pivoted laterally to said frame and adapted to swing horizontally, said standards having their horizontal arms provided with spindles, a rotatable shaft arranged centrally of said frame and journaled thereon, levers connected to the upper end of said standards and a connecting bar having pivotal connection with said levers, said connecting bar being provided with an outwardly facing rack, said shaft having pinions, one of said pinions engaging the downwardly facing rack of said connecting bar and the other pinion engaging the upwardly facing rack of said yoke, and means for manually actuating said shaft.

2. In a cultivator attachment, the combination with a frame, an inverted U shaped yoke having a toothed rack on the upper face of the upper central portion thereof and shanks with cultivator shovels thereon mounted on the lower portion of said yoke; of standards pivotally mounted on the vertical portion of said frame and having their lower portions bent at right angles to form spindles, a bar having a rack on the under face of its central portion, levers pivotally connecting said bar and the upper portions of said standards, a shaft mounted centrally on said frame carrying a pair of pinions, one engaging the upwardly facing rack on said yoke, the other engaging the downwardly facing rack on said bar and means to rotate said shaft, whereby when the wheels of said cultivator are turned in one direction, the yoke will simultaneously move in the opposite direction, thereby maintaining the shovels in proper alinement with the rows.

In testimony whereof I have signed my name to this specification in the presence of two subscribing witnesses.

CONRAD SELL.

Witnesses:
   E. J. CRAWFORD,
   E. O. MORRIS.